(12) United States Patent
Ishikawa et al.

(10) Patent No.: US 6,469,752 B1
(45) Date of Patent: Oct. 22, 2002

(54) ATTACHABLE PROTECTIVE SCREEN FOR IMAGE DISPLAY DEVICE AND INSTALLATION METHOD THEREFOR

(75) Inventors: Takayasu Ishikawa, Harrison City; Takashi Kawabe, Murrysville; James R. White, Allison Park; Marla G. Tanimoto, Verona; Jeffrey T. Batt, McMurray, all of PA (US)

(73) Assignees: Sony Corporation (JP); Sony Electronics, Inc., Park Ridge, NJ (US)

( * ) Notice: Subject to any disclaimer, the term of this patent is extended or adjusted under 35 U.S.C. 154(b) by 797 days.

(21) Appl. No.: 08/804,840

(22) Filed: Feb. 24, 1997

(51) Int. Cl.[7] .............................. H04N 5/56; H04N 5/72
(52) U.S. Cl. ........................................ 348/834; 348/823
(58) Field of Search ................................ 348/818, 823, 348/834, 781, 842; 359/609, 610, 611, 612, 613, 614; 313/461, 478; 315/8

(56) References Cited

U.S. PATENT DOCUMENTS

| | | | |
|---|---|---|---|
| 4,444,057 A | * 4/1984 | Fogelman et al. | 312/7.2 |
| 4,905,089 A | * 2/1990 | Liang et al. | 358/247 |
| 5,204,750 A | * 4/1993 | Ferraroni | 358/247 |
| 5,459,527 A | * 10/1995 | Lin | 348/819 |
| 5,592,241 A | 1/1997 | Kita et al. | 348/823 |
| 5,627,606 A | * 5/1997 | Pember et al. | 348/818 |
| 5,668,612 A | * 9/1997 | Hung | 348/818 |

* cited by examiner

Primary Examiner—Joseph Mancuso
Assistant Examiner—Mehrdad Dastouri
(74) Attorney, Agent, or Firm—Rader, Fishman & Grauer PLLC; Ronald P. Kananen, Esq.

(57) ABSTRACT

An image display device incorporating a screen protection arrangement and method of installing a protector screen on an image display device includes a device housing, a display screen installed in a wall portion of the device housing, a screen frame attached to the device housing so as to overlap peripheral edges of the display screen to define a frame opening bordering the display screen, top and bottom bracket portions provided on top and bottom edges of the screen frame and a protector screen which is attached to the image display device by mating its top and bottom edges with the top and bottom bracket portions. The arrangement results in a gap of less than 3.5 mm between the screen and the screen frame and allows installation of a protector screen to any generic screen frame of an image display device.

16 Claims, 5 Drawing Sheets

ATTACHABLE PROTECTIVE SCREEN FOR IMAGE DISPLAY DEVICE AND INSTALLATION METHOD THEREFOR

BACKGROUND OF THE INVENTION

1. Field of the Invention

The present invention relates generally to a protector screen which is installable over an image display such as a CRT (cathode ray tube), LCD (liquid crystal display), rear projection screen or other type of image display surface.

2. Description of the Related Art

Projection televisions are commonly fitted with a protector screen attached over the projection screen for protecting the imaging surface as well as for enhancing image contrast. Such a conventional type of projector screen as installed over a projection television screen is shown in FIG. 1.

As seen in FIG. 1, the projection television has a case 1 with a substantially open front face. A screen 3 is installed over the front opening of the case 1. The screen 3 is mounted via a screen frame 4 which includes a rectangular screen edge cover 4b having fastening material 20 provided on upper, lower, left and right sides of the screen cover 4b.

A protector screen 10 is utilized which is formed as a flat transparent panel which may be tinted, polarized, or the like. At peripheral edges of a rear surface of the protector screen 10, a fastening material 21 is provided corresponding to the fastening material 20 on the front surface of the screen edge cover 4b of the screen frame 4.

The fastening materials 20, 21 as utilized in such conventional arrangements may be comprised of paired elongate strips of mutual adhesives which easily are detached from one another (i.e. Velcro™, Luteflocking hook arrangements, etc.). That is, each strip of fastening material 20 affixed to the front edge surfaces of the screen frame 4 is matched with a corresponding strip of fastening material 21 provided on the peripheral edges of the inner surface of the protector screen 10. Appropriate mounting of the protector screen 10 is achieved when the fastening material strips 21 of the protector screen 10 are positionally aligned with the fastening material strips of the screen frame 4 and engaged therewith. Thus, such a screen protector 10 may be easily installed on an image display device such as a projection television.

A distinguishing feature of such conventional screen protector arrangements as noted above is that the flat panel screen protector is detachably installed on an outer surface of an edge covering portion of a frame of the image display screen. However, the degree of ease and reliability by which installation and/or detachment of the screen protector position may be effected relies heavily on the matched strips of fastening material 20, 21. Thus, for some users, the utility of such a fastening arrangement is compromised due to drawbacks associated with the fastening means.

For example, problems which are often inherent in such paired fastening materials may include: difficulty of separation, adherence of dust, lint or airborne particles thereto, and the possibility that the strips of fastening material themselves may peel or become dislodged from the surfaces to which they are attached.

Also, another drawback with this arrangement arises in that such conventional screen protection arrangements do not provide means for assuring precise realignment of the screen protector when a user reattaches the screen protector after having temporarily removed it for cleaning, etc. The user must reattach the screen protector "by eye", that is, the strips of fastening material on the screen protector must be visually aligned with those of the screen frame to assure suitable positioning of the screen protector.

The need for an image display device with means for protecting a screen thereof which could be easily attached and removed with consistent positioning and attractive appearance led to the development of a second attachable protective screen arrangement as disclosed in U.S. Pat. No. 5,592,241.

FIG. 2 shows this second prior art screen protection arrangement, which includes a screen frame 4 mounted so as to peripherally surround a display screen 3 of an image display device. A protector screen 10 is provided which has a width dimension which is substantially equal to that of the screen frame 4. This screen protection arrangement further includes an insertion space provided within an upper side of the screen frame 4 for accommodating an upper side of the protector screen 10. A base support portion 11 is also provided along a lower edge of the screen frame 4 in a supporting space defined between an inner side thereof and a facing surface of the display screen 3.

The screen frame 4 of this arrangement must be specially designed to establish a predetermined proportional relationship between width dimensions of the upper insertion space and the lower supporting space in consideration of a thickness dimension of the protector screen such that the protector screen 10 may easily be installed or removed from the image display device. This resulted in requiring a relatively large gap between the screen 3 and the screen frame 4 of at least 3.5 mm, as seen in FIG. 2. Installation of the protection screen 10 was not possible without this large gap.

Accordingly, a need exists for an image display device with means for protecting a screen thereof, i.e. a screen protector for an image display device such as projection televisions and the like, which can easily be attached to a screen frame without requiring a gap of 3.5 mm or more between the screen and the screen frame.

Further, it is desirable to provide a versatile protector screen arrangement, for example, wherein the screen protector may be attached to a generic screen frame without requiring the screen frame to be specially designed for receiving a screen protector.

SUMMARY OF THE INVENTION

It is therefore a principle object of the present invention to overcome the drawbacks of the related art.

It is a further object of the present invention to provide an image display device including a screen protector which, when attached to a screen frame of the device, only requires a gap of less than or equal to 1 mm between the screen and the screen frame.

It is also an object of the invention to provide a protector screen arrangement which does not require a specially designed screen frame but rather, wherein the protector screen may be attached to a generic screen frame of an image display device.

Additional objects, advantages and novel features of the invention will be set forth in the description which follows, and will become apparent to those skilled in the art upon reading this description or practicing the invention. The objects and advantages of the invention may be realized and attained by the appended claims.

To achieve the foregoing and other objects and in accordance with the purposes of the present invention, as embodied and broadly described herein, there is provided an image display device incorporating screen protection means including a device housing, a display screen installed in a wall portion of said device housing, a screen frame attached to said device housing so as to overlap peripheral edges of said display screen to define a frame opening bordering said display screen, a top bracket portion provided on a top edge of said screen frame, this top bracket portion defining a concave support groove along said top edge of said screen frame, a bottom bracket portion provided on a bottom edge of said screen frame, said bottom bracket portion defining a support section along said bottom edge of said screen frame, a protector screen, having top, bottom, left side and right side edges, which is attached to said image display device by mating its top and bottom edges with said top and bottom bracket portions, respectively.

Further, it will be noted that the protection means may advantageously also include a left side channel support portion provided on said image display device at a location corresponding to a left side edge of said screen frame, said left side channel support portion defining a concave support groove along said left side edge of said screen frame, a right side channel support portion provided on said image display device at a location corresponding to a right side edge of said screen frame, said right side channel support portion defining a concave support groove along said right side edge of said screen frame, wherein said left side and right side edges of said protector screen are attached to said image display device by mating these left and right edges of said protector screen with said left and right side channel support portions, respectively.

More specifically, each of the bracket portions and channel support portions are removably mountable on said image display device. Also, the display screen and said screen frame are parallel and separated by a gap of 3.5 mm or less, preferably no more than 1 mm.

According to a further aspect of the present invention, the objects and purpose of the invention are achieved by a method of installing a protector screen on an image display device, comprising the steps of providing a top bracket portion on said image display device at a location corresponding to a top edge of a screen frame of said image display device so as to define a concave support groove along said top edge of said screen frame, providing a bottom bracket portion on said image display device at a location corresponding to a bottom edge of said screen frame so as to define a concave support groove along said bottom edge of said screen frame, providing a left side channel support portion on said image display device at a location corresponding to a left side edge of said screen frame so as to define a concave support groove along said left side edge of said screen frame, providing a right side channel support portion on said image display device at a location corresponding to a right side edge of said screen frame so as to define a concave support groove along said right side edge of said screen frame, and attaching a protector screen to the image display device by mating top, bottom, left and right sides of said protector screen to said top and bottom bracket portions and said left side and right side channel support portions, respectively.

BRIEF DESCRIPTION OF THE DRAWINGS

The present invention will become more clearly appreciated as the disclosure of the present invention is made with reference to the accompanying drawings. In the drawings.

DETAILED DESCRIPTION OF THE INVENTION

Reference will now be made in detail to preferred embodiments of the invention, examples of which are illustrated in the accompanying drawings.

Figure 1:
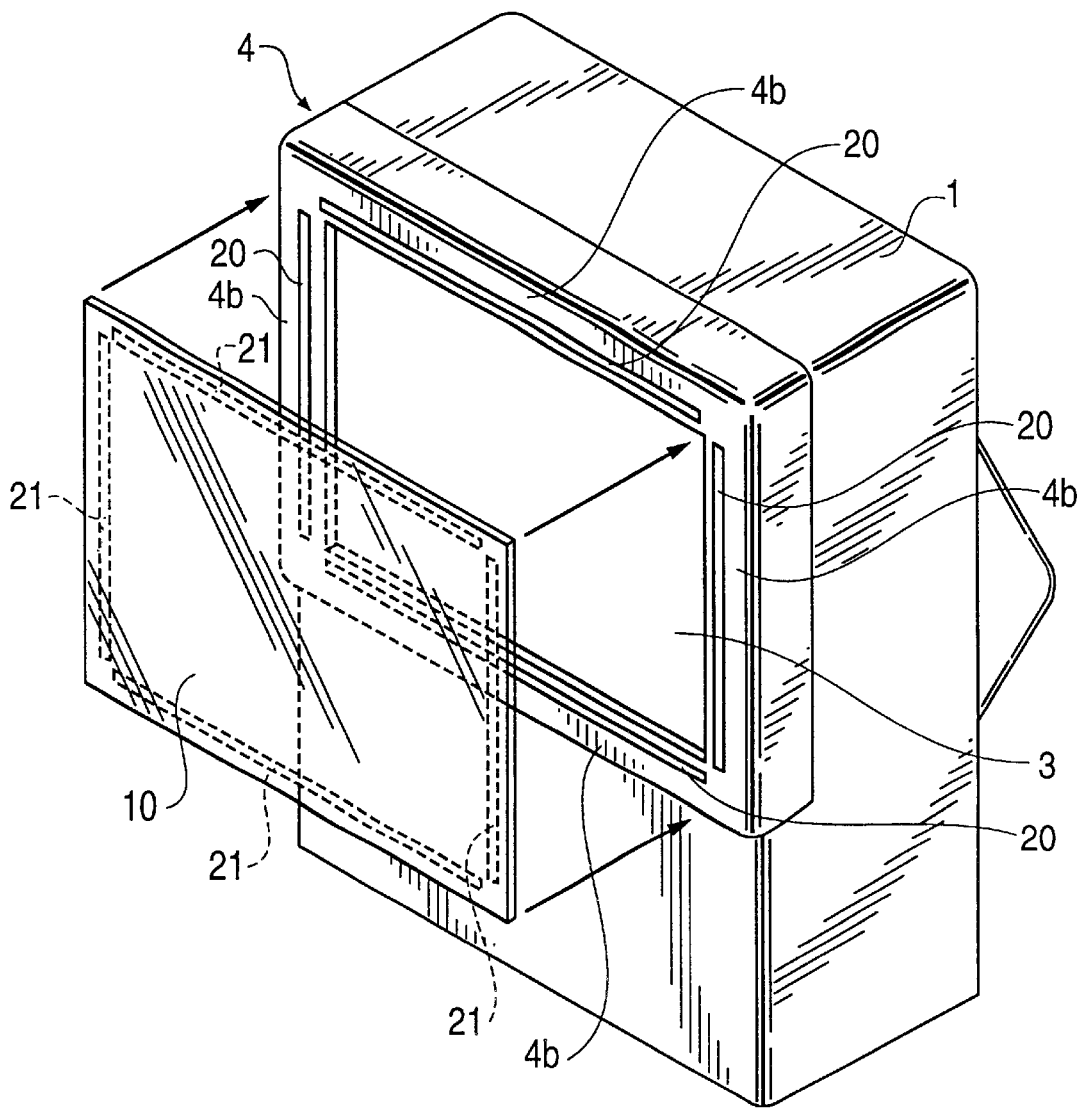
FIG. 1 is a perspective view of a conventional screen protection arrangement for a projection television as elaborated in the Description of the Related Art.
Figure 2:
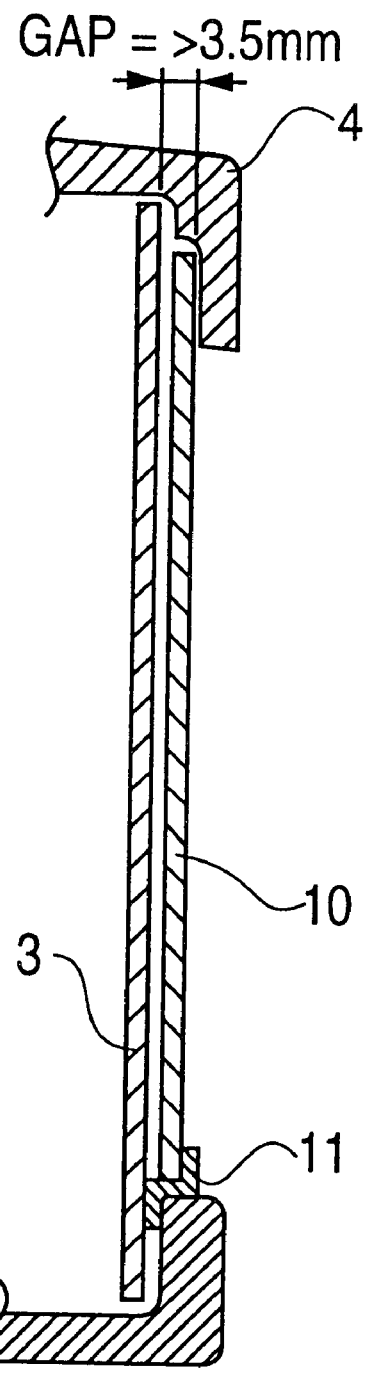
FIG. 2 is a cross section view of another conventional screen protection arrangement for a projection television as elaborated in the Description of the Related Art.
Figure 3:
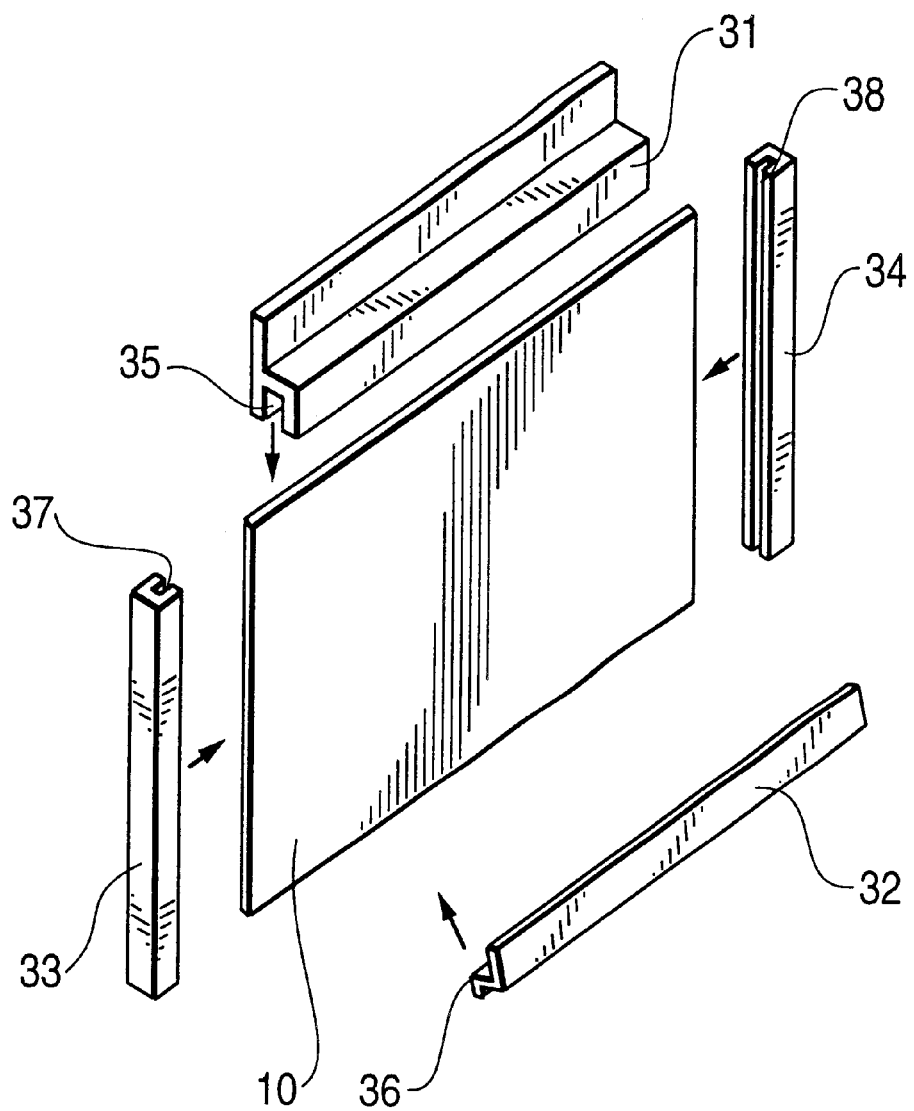
FIG. 3 is a perspective view of a protector screen as well as top and bottom bracket portions and left and right side channel support portions for attaching to said protector screen.

FIG. 3 is a perspective view of protector screen 10 as well as top and bottom bracket portions 31, 32 and left and right side channel support portions 33, 34 for attaching to the protector screen 10. The top bracket portion 31 defines a concave support groove 35 with which the top edge of the protector screen 10 comes into a mating connection. The bottom bracket portion 32 defines a support section 36 which mates with the bottom edge of the protector screen 10. The left side channel support portion 33 defines a concave support groove 37 which mates with the left edge of the protector screen 10. The right side channel support portion 34 defines a concave support groove 38 which mates with the right edge of the protector screen 10.

Figure 4:
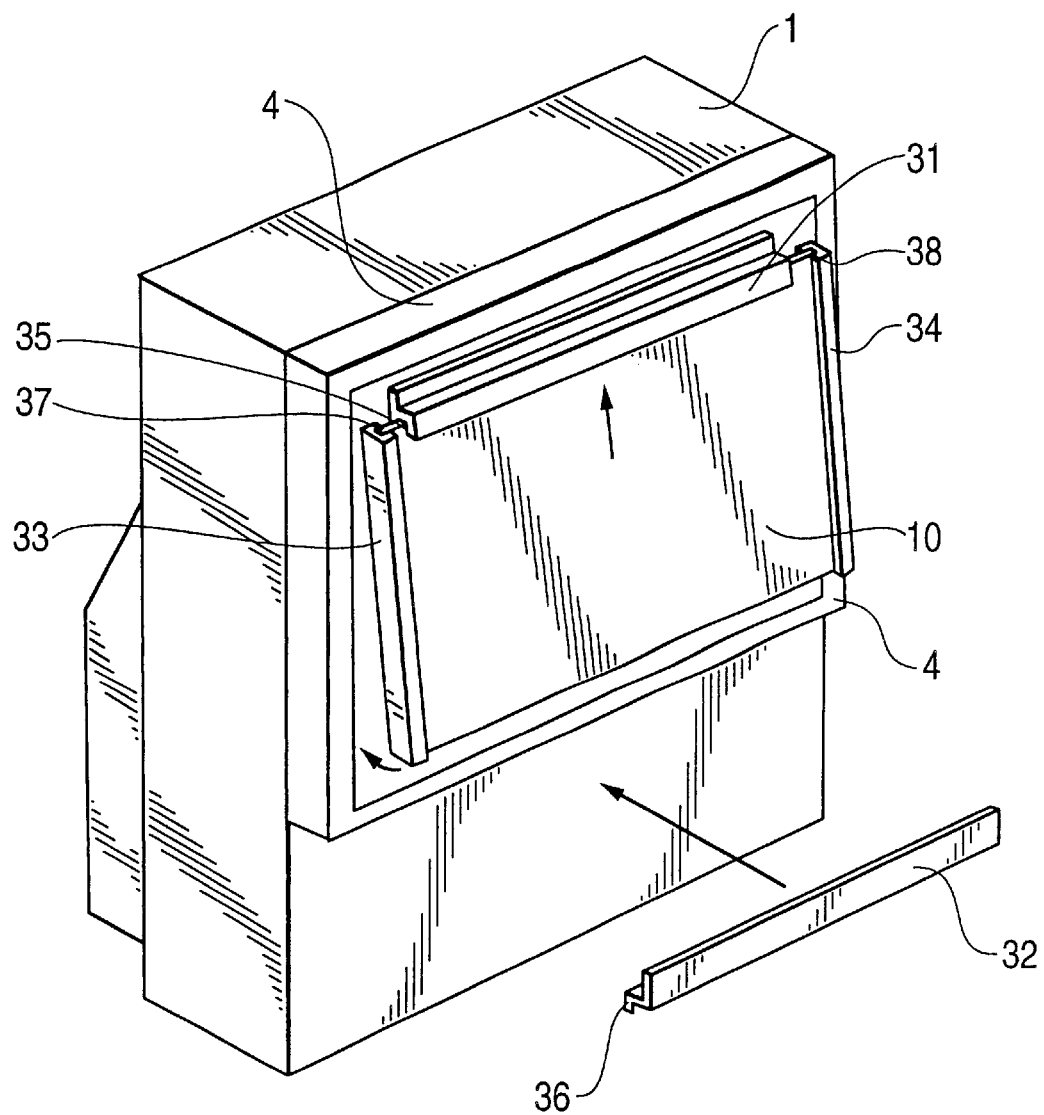
FIG. 4 is a perspective view showing the protector screen, bracket portions and channel support portions of FIG. 3 being installed in an image display device.

FIG. 4 is a perspective view showing the protector screen, bracket portions and channel support portions of FIG. 3 installed in an image display device. The top bracket portion 31 attaches to the top edge of the screen frame 4 so that its concave support groove 35 extends along the length of the top edge of the frame. The bottom bracket portion 32 attaches to the bottom edge of the screen frame 4 so that its support section 36 extends along the length of the bottom edge of the frame 4. The left side channel support portion 33 comes into contact with the left side edge of the screen frame 4 so that its concave support groove 37 extends along the length of the left side edge of the frame 4. The right side channel support portion 34 comes into contact with the right side edge of the screen frame 4 so that its concave support groove 38 extends along the length of the right side edge of the frame 4.

Figure 5:
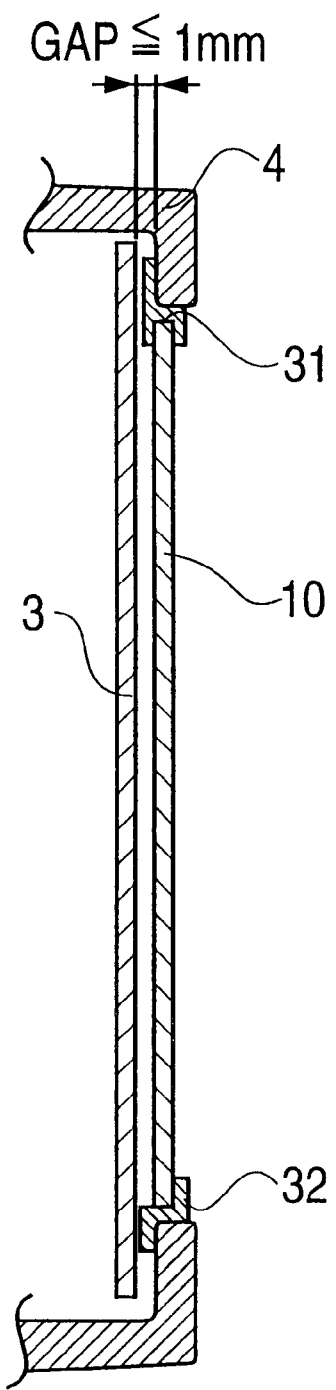
FIG. 5 is a cross section view of a screen protection arrangement according to a preferred embodiment of the present invention.

FIG. 5 is a cross section view of this screen protection arrangement showing the generic screen frame 4 connected to top and bottom bracket portions with the protector screen 10 connected between these two bracket portions.

As indicated by these exemplary embodiments, the invention results in a superior method to attach a protector screen to a generic screen frame, eliminating the gap of 1 mm or more between the screen and the screen frame that is present in prior art arrangements. Further, the need to design a special screen frame with a designed-in gap in order to accommodate the protector screen is no longer necessary. The protector screen of the instant invention can be used with a generic screen frame of an image display device.

These embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An image display device incorporating a screen protector, comprising:
   a display device housing:
   a display screen installed in said device housing;
   a protector screen mounted over said display screen;
   a frame attached to said device housing so as to overlap peripheral edges of said display screen, wherein said frame is attached to said housing so as to define a gap between said frame and said display screen;
   a top bracket comprising an elongated ridge removably received in said gap between said frame and an upper edge of said display screen and a concave support groove engaging an upper edge of said protector screen; and
   a bottom bracket comprising an elongated ridge removably received in said gap between said frame and a lower edge of said display screen and a support section engaging a lower edge of said protector screen.

2. The image display device of claim 1, further comprising:
   a left bracket having defined therein a concave support groove in which a left side of said protector screen is engaged, said left bracket also abutting a left side edge of said frame; and
   a right bracket having defined therein a concave support groove in which a right side of said protector screen is engaged, said right bracket also abutting a right side edge of said frame.

3. The image display device of claim 1, wherein each of said top and bottom brackets are removably engaged to said upper and lower edges of said protector screen, respectively.

4. The image display device of claim 2, wherein each of said left and right brackets are removably engaged on said left and right edges of said protector screen, respectively.

5. The image display device of claim 1, wherein said gap is less than 3.5 mm.

6. The image display device of claim 1, wherein said gap is less than or equal to 1 mm.

7. The image display device of claim 2, wherein said gap is less than 3.5 mm.

8. The image display device of claim 2, wherein said gap is less than or equal to 1 mm.

9. A method of protecting the display screen of an image display device with a screen protector comprising mounting said protector screen over said display screen, said mounting further comprising:
   attaching a frame to a housing of said display device so as to define a gap between said frame and said display screen;
   engaging an upper edge of said protector screen with a concave support groove defined in a top bracket;
   inserting an elongated ridge of said top bracket in said gap between said frame and an upper edge of said display screen;
   engaging a lower edge of said protector screen with a support section of a bottom bracket; and
   inserting an elongated ridge of said bottom bracket in said gap between said frame and a lower edge of said display screen.

10. The method of claim 9, further comprising:
    engaging a left side of said protector screen in a concave support groove of a left bracket; and
    engaging a right side of said protector screen in a concave support groove of a left bracket.

11. The method of claim 9, wherein said engaging steps comprise removably engaging said top and bottom brackets on said upper and lower edges of said protector screen, respectively.

12. The method of claim 10, wherein said engaging steps comprise removably engaging said left and right brackets on said left and right edges of said protector screen, respectively.

13. The method of claim 9, wherein said gap is less than 3.5 mm.

14. The method of claim 9, wherein said gap is less than or equal to 1 mm.

15. The method of claim 10, wherein said gap is less than 3.5 mm.

16. The method of claim 10, wherein said gap is less than or equal to 1 mm.

* * * * *